United States Patent [19]

Ashworth

[11] 4,342,280
[45] Aug. 3, 1982

[54] BICYCLE AND MOTOR BIKE WARNING SIGNAL DEVICE

[76] Inventor: Sara Ashworth, 115 Carlton Ave., Trenton, N.J. 08618

[21] Appl. No.: 173,592

[22] Filed: Jul. 30, 1980

[51] Int. Cl.$^3$ .............................................. B60Q 1/34
[52] U.S. Cl. ..................................... 116/202; 116/51
[58] Field of Search ................. 116/202, 35 A, 51, 52, 116/53, 28 R

[56] References Cited

U.S. PATENT DOCUMENTS

| | | |
|---|---|---|
| 564,454 | 7/1896 | Ryan . |
| 1,600,887 | 9/1926 | Kimbrough . |
| 1,624,300 | 4/1927 | Wood . |
| 1,873,033 | 8/1932 | Reynolds . |
| 2,226,159 | 12/1940 | Hoffmann . |
| 2,551,193 | 5/1951 | Williams ............................... 116/52 |
| 2,815,732 | 12/1957 | Majors ............................... 116/28 R |
| 2,898,878 | 8/1959 | Reinholdt ......................... 116/28 R |
| 3,684,346 | 8/1972 | Lang . |
| 3,684,848 | 8/1972 | Davies . |
| 3,768,433 | 10/1973 | Dian . |
| 3,950,727 | 4/1976 | Smith . |
| 3,961,811 | 6/1976 | Brilando et al. . |
| 3,975,083 | 8/1976 | Rowland . |
| 4,105,296 | 8/1978 | Tomlin . |

FOREIGN PATENT DOCUMENTS 827116  1/1938  France ................................ 116/53

*Primary Examiner*—Robert I. Smith

*Attorney, Agent, or Firm*—Charles B. Cannon

[57] ABSTRACT

A bicycle or motor bike warning signal device is provided which may be mounted on a supporting element on a bicycle, such as a rear frame member of the bicycle, or on a bicycle rack or carrier at the rear of the bicycle, or on the frame of a motor bike, and includes a supporting rod or arm and attached light-reflective warning signal element which are manually movable by the bicycle or motor bike rider from a generally vertical and ineffective or daylight position at one side of the bicycle frame or the bicycle rack, or from the frame of a motor bike, into a generally horizontal and nighttime warning signal position at one side of the bicycle or motor bike. The warning signal device includes a supporting rod or arm on the outer end portion of which a light-reflective warning signal element is mounted, and a first mounting or clamping means for mounting the supporting rod or arm and attached light-reflective warning signal element on a supporting element on a bicycle, such as on a rear frame member of a bicycle, or on the frame of a motor bike, and a second and pivotal mounting means for pivotally and rotatably mounting the supporting rod or arm and attached light-reflective warning signal element on the first mounting or clamping means. The new warning signal device may also be arranged in horizontal position, in daylight, to warn drivers of cars or other vehicles to maintain a suitable distance from the bicycle or motor bike on which the new warning signal is mounted.

1 Claim, 8 Drawing Figures

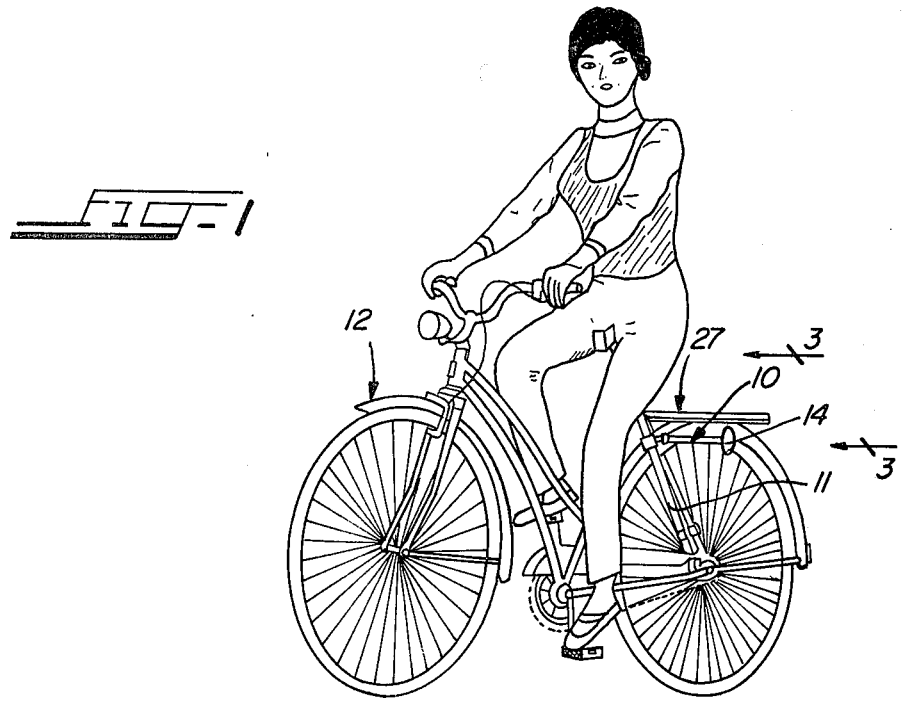
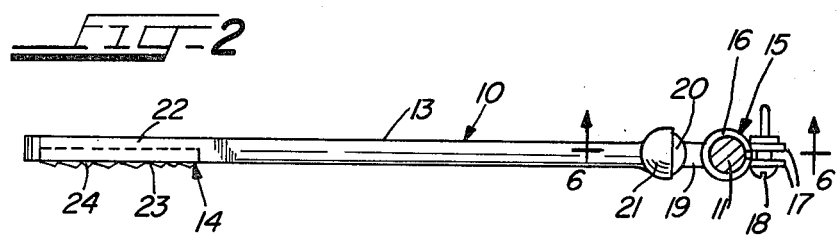
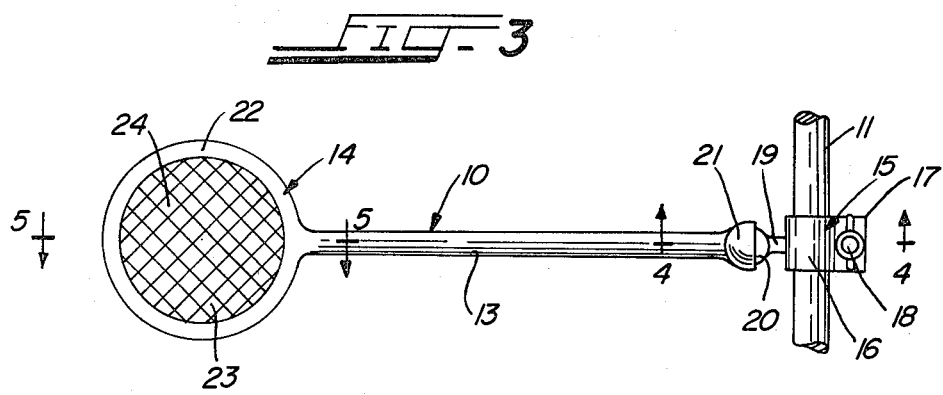

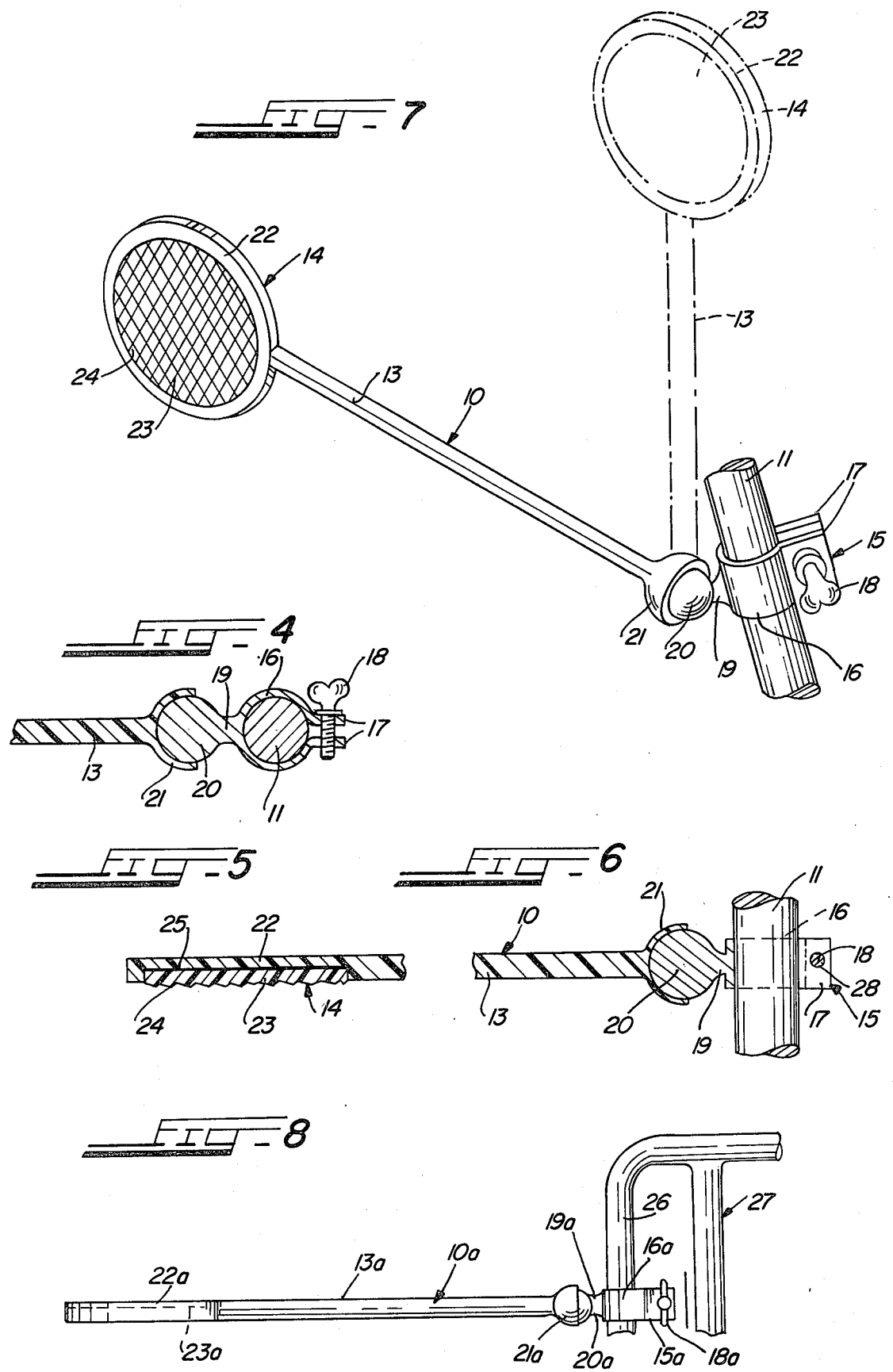

4,342,280

BICYCLE AND MOTOR BIKE WARNING SIGNAL DEVICE

BACKGROUND OF THE INVENTION

Bicycle and other vehicle warning signal devices have been provided heretofore but many of them are relatively complex in construction and expensive to manufacture and unsatisfactory in use. The prior art of such bicycle and like warning signal devices is represented by U.S. Pat. Nos. 564,454 to Ryan dated July 21, 1896 on Adjustable Mirror for Bicycles; No. 1,624,300 to Wood dated Apr. 12, 1927 on Reflector Jewel Mounting; No. 1,873,033 to Reynolds dated Aug. 23, 1932 on Automobile Signaling Device; No. 2,226,159 to DeHoffman dated Dec. 24, 1940 on Reflector Signal Device; No. 3,768,433 to Dian et al dated Oct. 30, 1973 on Side Reflectors for Bicycles and the Like; No. 3,950,727 to Smith dated Apr. 13, 1976 on Fold-Away Rear Turn Indicators for Motorcycles; and No. 3,961,811 to Brilando et al dated June 8, 1976 on Bicycle Reflector Bracket; a bicycle warning signal device manufactured and sold in Finland by a firm believed to be known as "B. Herrmans;" and a bicycle warning signal device made by a firm known as Dimension Weld of Stamford, Conn.

OBJECTS OF THE INVENTION

An object of the present invention is to provide a new and improved bicycle and motor bike warning signal device which is relatively simple and inexpensive in construction and which may be readily mounted on the frame of the bicycle at the rear thereof, or on a bicycle baggage rack or carrier, or on a motor bike, and includes a supporting arm or rod and attached light-reflective warning signal element which are pivotally movable from an effective or nighttime warning signal position extending laterally or generally horizontally from the frame of the bicycle, at one side thereof, or from a baggage rack or carrier thereon, or from the frame of a motor bike, into an ineffective or daytime position extending generally vertically at the side of the bicycle or a baggage rack or carrier thereon, or from the frame of the motor bike.

Another object of the invention is to provide a new and improved bicycle and motor bike warning signal device which may be readily manipulated by the rider into effective or nighttime warning signal position extending laterally or generally horizontally from the frame of the bicycle, or from a baggage rack or carrier thereon, or from the frame of a motor bike, into ineffective or daytime position extending generally vertically at one side of the bicycle.

An additional object of the invention is to provide a new and improved bicycle and motor bike warning signal device which embodies a first mounting or clamping means for mounting the supporting rod or arm of the light-reflective warning signal on a rear frame member of the bicycle, or on a baggage rack or carrier at the rear thereof, or on the frame of a motor bike, and a second and pivotal mounting means for pivotally mounting the supporting rod or arm and the warning signal attached thereto on the first mounting or clamping means so that the supporting rod or arm and attached light-reflective warning signal may be pivoted in a generally vertical plane into an effective or generally horizontal position and into a generally vertical or ineffective position, while also being rotatably movable about its pivotal mounting in a horizontal plane and in a second and generally vertical plane which is at right angles to the first and generally vertical plane so that the light-reflective warning signal device may be positioned in proper position for reflection regardless of the angular position of the frame member of the bicycle frame or the frame of a motor bike, on which the supporting arm or rod and the light-reflective warning signal element thereof may be mounted by the first mounting or clamping means.

Other objects will appear hereinafter.

DESCRIPTION OF FIGURES IN THE DRAWINGS

FIG. 1 is a perspective view of a conventional bicycle showing the new bicycle and motor bike warning signal device mounted on a rear frame member thereof and showing the bicycle and motor bike warning signal device extending generally horizontally or laterally from a rear frame member of a bicycle frame into effective or nighttime warning signal position;

FIG. 2 is a top plan view of the new bicycle or motor bike warning signal device;

FIG. 3 is a rear elevational view on line 3—3 in FIG. 1;

FIG. 4 is an enlarged fragmentary sectional view on line 4—4 in FIG. 3, illustrating the first mounting or clamping means for mounting the new bicycle and motor bike warning signal device on a rear frame member of a bicycle, or on a baggage rack or carrier at the rear thereof, or from the frame of a motor bike, and illustrating the pivotal mounting means for pivotally mounting the supporting rod or arm and attached light-reflective signal element on the first mounting or clamping means;

FIG. 5 is a fragmentary sectional view of the light-reflective warning signal element on line 5—5 FIG. 3;

FIG. 6 is an enlarged fragmentary sectional view on line 6—6 in FIG. 2 illustrating the first mounting or clamping means for mounting the bicycle or motor bike warning signal device on a rear frame member of a bicycle or on a baggage rack or carrier at the rear thereof, and also illustrating the pivotal mounting means for mounting the supporting rod or arm and attached lightreflective warning signal element on the first mounting or clamping means;

FIG. 7 is a perspective view illustrating the new warning signal device in full lines in effective or generally horizontal nighttime warning signal position and in dash lines in generally vertical position in daytime or ineffective position; and FIG. 8 is a top plan view illustrating the new bicycle or motor bike warning signal device attached to a baggage rack or carrier at the rear of the bicycle.

DESCRIPTION OF THE INVENTION ILLUSTRATED IN THE DRAWINGS

A typical and preferred embodiment of the invention is illustrated in the drawings, wherein it is generally indicated at 10, and is shown, in FIGS. 1 to 7, inclusive, as being mounted on a rear frame member 11 of a bicycle 12.

The new bicycle or motor bike warning signal device 10 includes a supporting rod member or arm 13 which may be made of metal, such as aluminum or steel, or of plastic resinous material, on the outer end portion of which a light-reflective warning signal unit 14 is mounted. The supporting rod member or arm 13 may be mounted on a supporting element on a bicycle, such as the rear frame member 11 of the bicycle 12, or on the frame of a motor bike, by means of a metallic, plastic resinous or like mounting or clamping means in the form of a clamping unit 15 which includes a generally circular body portion 16 which is adapted to encircle the frame member 11 and has a pair of laterally and generally parallel clamping arms 17 which project laterally from the generally cylindrical body portion 16 and are adapted to be clamped together by means of suitable fastening means which is shown as being in the form of a wing-head clamping screw 18 which is threaded into tapped or threaded openings 28 in the clamping arms 17 (FIG. 6).

As shown in the drawings (FIGS. 2 to 7, inclusive) the cylindrical body portion 16 of the clamping unit 15 has formed integrally therewith, at the inner end thereof, a web portion 19 which has a ball-shaped mounting head 20 formed integrally therewith at the inner end thereof. The supporting rod or arm 13 has a generally semi-cylindrically shaped socket member or portion 21 formed integrally therewith at its inner end and which at least partially encircles the ball-shaped mounting head 20, thereby providing a ball and socket joint and pivotal connection between the supporting rod member or arm 13 and the clamping unit 15-16-17-18.

The warning signal unit or element 14 includes a geometrically-shaped frame 22 which is preferably formed integrally with the supporting rod member or arm 13 at the outer end thereof, and is shown as being generally circular in shape, but may be of any suitable geometrical design and shape, and houses at one side thereof a light-reflective warning signal element 23 which is adhesively or otherwise mounted in a generally circular recess 25 in the frame 22 but, like the frame 22, may be in any desired geometrical shape or form. The light-reflective element 23 may be made of any suitable light-reflective red colored material such, for example, as glass, acrylic or other plastic resinous material, or the like, and, as shown in FIGS. 2, 3, 5 and 7, the light-reflective element 23 has a roughened outer surface 24 to increase or enhance its reflectivity.

In the use of the invention, as shown in FIGS. 1 to 7, inclusive, the new bicycle or motor bike warning signal device 10 may be assembled with the socket member or portion 21 on the inner end portion of the supporting rod or arm 20 at least partially and frictionally embracing the ball-shaped socket head 20, whereupon the assembly of the supporting rod or arm 13 and attached light-reflective warning signal element 14 and clamping unit 15-16-17-18 may be mounted on the rear frame member 11 of the bicycle 12, or on the frame of a motor bike, by means of the mounting or clamping means in the form of the clamping unit 15 which may be frictionally held on the frame member 11 by tightening the wing head screw 18 in the threaded or tapped openings 28 in the clamping arms 17.

When thus so mounted in position of use, the new bicycle or motor bike warning signal device 10 may be positioned in effective or nighttime and generally horizontally extending warning signal position, as shown in FIG. 1, and as shown in full lines in FIG. 7, by manually pivoting the supporting rod member or arm 13 and attached warning signal element 14, on the ball and socket mounting 20-21, into a laterally and generally horizontally extending position, whereupon the supporting rod or arm 13 and attached warning signal element 14 will be held in a generally horizontally extending and nighttime warning signal position by frictional engagement of the socket member 21 with the ball-shaped head 20. The extent of such frictional engagement may be adjusted in the manufacture of the parts, and selection of the material of which they are made, so as to assure that the supporting rod member or arm 13 and attached warning signal element 14 will be held in the desired warning signal position against vibration of the bicycle 12, or motor bike, and attached warning signal device 10, in use.

When not in use, under daylight or clear weather conditions, the new warning signal device 10 including the supporting rod or arm 13 and attached warning signal element 14 may be manually pivoted by the bicycle or motor bike rider on the ball and socket mounting 20-21 from a generally horizontal or nighttime warning signal position, as shown in FIG. 1 and in full lines in FIG. 7, into ineffective or vertical position, as shown in dash lines in FIG. 7, by manually pivoting the supporting rod or arm 13 and attached warning signal element 14 on the ball and socket mounting 20-21.

However, the new warning signal device, even in daylight, may be maintained in horizontal position, as in full lines in FIG. 7, to serve as a warning to drivers of cars and other vehicles to maintain a proper distance from the bicycle or motor bike on which the new warning signal device is mounted.

The supporting rod or arm 13 and attached warning signal element 14 may be manually rotated on the ball and socket mounting 20-21 in a generally horizontal plane and in a generally vertical plane at a generally right angle to the vertical plane in which the supporting rod or arm 13 and attached warning signal element 14 are pivoted into and out of effective or nighttime warning signal position (FIG. 7), so as to assure that the warning signal element 14 will be properly positioned in effective or nighttime warning signal position regardless of the angle at which the frame member 14, on which the new warning signal device 10 is mounted, extends relative to the frame and longitudinal front to rear axis of the bicycle 12, or from the frame of a motor bike.

The new bicycle or motor bike warning signal device is shown in FIG. 8 as mounted on a supporting element of a bicycle which is in the form of a rail or slat member 26 of a bicycle baggage or carrier rack 27, and those parts of the invention as shown in FIG. 8 which correspond to similar parts of the invention as shown in FIGS. 1 to 7, inclusive, have been given the same reference numerals followed by the additional and distinguishing reference character "a".

The new bicycle or motor bike warning signal device 10 is relatively simple and inexpensive in construction and may be readily operated by the bicycle or motor bike rider by means of one hand while riding the bicycle.

It will thus be seen from the foregoing description, considered in conjunction with the accompanying drawings, that the present invention provides a new and improved bicycle or motor bike warning signal device having the desirable advantages and characteristics and accomplishing its intended objects including those hereinbefore pointed out and others which are inherent in the invention.

I claim:

1. A warning signal device adapted to be mounted on a supporting element on a vehicle in the form of a bicycle, motor bike, or like vehicle, comprising:
   (a) a supporting arm member including
      (1) an outer end portion having thereon
      (2) a light-reflective warning signal element;
      (3) an inner end portion;
      (4) clamping means for detachably mounting the said inner end portion of the said supporting arm member and attached light-reflective warning signal element on a supporting element on the vehicle and at one side thereof;
      (5) pivotal mounting means for pivotally mounting the said supporting arm member and attached light-reflective warning signal device on the said clamping means so that the said supporting arm member and the said light-reflective warning signal element thereof may be manually pivoted by the vehicle rider on the said pivotal mounting means into a generally horizontally extending effective or nighttime warning signal position at one side of the vehicle or into a generally vertically extending and upright and daylight or ineffective position, the said pivotal mounting means including
         a. a ball-shaped head formed integrally with and as a lateral extension of the said clamping means at one side thereof; and
         b. a socket member formed as an integral extension of the said supporting arm member at the said inner end portion thereof.
      (6) the said socket member frictionally embracing the said ball-shaped head to enable the said supporting arm member and the said light-reflective warning signal element thereof to be manually pivoted on the said ball-shaped head into, and to be frictionally retained in, a generally horizontally extending effective or nighttime warning signal position at one side of the vehicle or into a generally vertically extending and upright daylight position;
      (7) the said clamping means including
         a. a web member formed integrally with the said clamping means at one side thereof and projecting laterally therefrom; and
         b. the said ball-shaped head being formed as an integral extension of the said web member.

* * * * *